United States Patent
Aso (10) Patent No.: US 8,385,251 B2
(45) Date of Patent: Feb. 26, 2013

(54) DATA COMMUNICATION CONTROL APPARATUS, DATA COMMUNICATION SYSTEM, DATA COMMUNICATION METHOD, AND COMPUTER-READABLE STORAGE MEDIUM RECORDING DATA COMMUNICATION PROGRAM

(75) Inventor: Takashi Aso, Osaka (JP)

(73) Assignee: Icom Incorporated, Osaka (JP)

( * ) Notice: Subject to any disclaimer, the term of this patent is extended or adjusted under 35 U.S.C. 154(b) by 402 days.

(21) Appl. No.: 12/550,577

(22) Filed: Aug. 31, 2009

(65) Prior Publication Data

US 2010/0054174 A1    Mar. 4, 2010

(30) Foreign Application Priority Data

Sep. 2, 2008    (JP) .................. 2008-225176

(51) Int. Cl.
*H04W 24/00*    (2009.01)
(52) U.S. Cl. ................... 370/315; 455/456.1; 455/456.5
(58) Field of Classification Search .................. 370/315; 455/456.1, 456.5
See application file for complete search history.

(56) References Cited

U.S. PATENT DOCUMENTS

2005/0176402 A1    8/2005  Verloop et al.
2006/0251034 A1 *  11/2006 Park .............................. 370/338

FOREIGN PATENT DOCUMENTS

| EP | 1156631 A1 | 11/2001 |
| EP | 1517575 A2 | 3/2005 |
| JP | H09-191487 | 7/1997 |
| JP | 2006-108823 | 4/2006 |
| JP | 2007-096932 | 4/2007 |

OTHER PUBLICATIONS

European Search Report of corresponding European Patent Application No. 09168905.9.
Japanese Office Action issued Aug. 15, 2012 in Japanese Patent Application No. 2008-225176, 2 pages.

* cited by examiner

*Primary Examiner* — Melvin Marcelo
(74) *Attorney, Agent, or Firm* — Baker & McKenzie, LLP (57) ABSTRACT

A user location monitoring unit of a data communication control apparatus monitors a message sent from a wireless device via a repeater. Upon detection of a change in the location of the wireless device, the user location monitoring unit updates the location information in the database and notifies via the Internet a management server of the location change. Upon receipt of the message via the Internet, a destination address confirming and correcting unit of the data communication control apparatus uses the user ID of a destination wireless device as a search keyword to search the database. In turn, the destination address confirming and correcting unit corrects the destination address of the message to the latest address of the pertinent user ID and outputs the corrected message to a received message forwarding unit.

12 Claims, 6 Drawing Sheets

| USER ID (WIRELESS DEVICE) | IP ADDRESS (DATA COMMUNICATION CONTROL APPARATUS) | AREA ID (CONTROLLER, REPEATER) | Additional information |
|---|---|---|---|
| J¥1QQQ | 12.34.56.78 | J¥1XXX | |
| J¥1PPP | 12.34.56.78 | J¥1YYY | |
| J¥1OOO | 23.45.67.89 | J¥1SSS | |
| .... | .... | .... | |

DATA COMMUNICATION CONTROL APPARATUS, DATA COMMUNICATION SYSTEM, DATA COMMUNICATION METHOD, AND COMPUTER-READABLE STORAGE MEDIUM RECORDING DATA COMMUNICATION PROGRAM

RELATED APPLICATION

This application is based on Japanese Patent Application No. 2008-225176 filed on Sep. 2, 2008 and including specification, claims, drawings and summary. The disclosure of the above Japanese Patent Application is incorporated herein by reference in its entirety.

BACKGROUND OF THE INVENTION

1. Field of the Invention

The present invention relates to a network-based mobile communication technology.

2. Description of the Related Art

In mobile communication, to connect to a destination mobile terminal device, the area where the destination mobile terminal device exists always needs to be known (referred to as a "cell" in a mobile phone system and the like). Unexamined Japanese Patent Application KOKAI Publication No. 2006-108823 discloses a data communication system in which communication between mobile terminal devices (armature radio) is achieved by identifying the areas where the terminals exist.

In particular, recent years have seen an increase in the number of subscribers due to the dissemination of mobile communication. The area of coverage by each wireless station is made smaller for effective use of limited resources of wireless communication. As the area becomes smaller, the frequency of switching of area due to the travel of mobile terminal device users has increased, and location registration occurs frequently. The used portion of the wireless control channel increases, and location registration of mobile terminal devices becomes inefficient.

Unexamined Japanese Patent Application KOKAI Publication No. H9-191487 describes a mobile communication system for expediting location registration of mobile terminal devices so as to increase the success rate of registration. This mobile communication system comprises a plurality of base stations and a location register which registers the area where each mobile terminal device exists. Each base station services a plurality of mobile terminal devices, and the base stations are mutually connected via the network.

Each base station comprises a channel status detecting unit for detecting the status of channels and a channel assignment changing unit. Upon notification from a mobile terminal device that the wireless control channel is running out, the channel assignment changing unit temporarily changes a free channel to a channel for location registration based on the detection results of the channel status detecting unit.

A mobile terminal device comprises a channel monitoring unit and a location registering unit. Upon switching of area due to the travel of its user, the channel monitoring unit of the mobile terminal device notifies the base station that the wireless control channel does not have a space for location registration by the location register. The location registering unit performs location registration using a channel for location registration, whose role has been changed as specified by the base station.

When the portion of the used space increases in the wireless control channel, a free space of the general communication channel is temporarily used as a channel for location registration. The success rate of location registration requests increases, and base stations servicing terminal devices whose locations cannot be identified decreases. The quality of service improves accordingly.

The present invention is made in view of the foregoing problem. More specifically, the present invention is directed to providing a mobile communication technique that enables a data communication control apparatus, etc. to properly send data to a mobile terminal device that has already moved from one service area to another even prior to its location being registered in the location register.

SUMMARY OF THE INVENTION

To achieve the above object, a data communication control apparatus according to a first aspect of the present invention is used by a communication apparatus in a network communicable with a repeater which relays target data wirelessly exchanged between mobile terminal devices, the data communication control apparatus comprising: a database unit that holds first search information which associates a terminal identification numeral of the mobile terminal device with location information on the repeater as well as second search information which associates the terminal identification numeral of the mobile terminal device with an address in the network; a first updating unit that receives from the repeater latest location information on the mobile terminal device and updates the first search information based on the latest location information; forwarding units that receive from the network the target data and a destination terminal identification numeral thereof, search destination location information associated with the destination terminal identification numeral by referring to the first search information, and forward the target data to the repeater associated with the destination location information; and a correcting unit that receives from the network the target data and a departure terminal identification numeral thereof, searches a first departure address associated with the departure terminal identification numeral by referring to the second search information, and corrects the second search information when the first departure address differs from a second departure address that has already been assigned to the target data.

The data communication control apparatus may further comprise: an adding unit that receives from the repeater the target data and the destination terminal identification numeral thereof, searches the destination location information and a destination address associated with the destination terminal identification numeral by referring to the first search information and the second search information, and adds the destination location information and the destination address to the target data; and a sending unit that sends the target data, to which the destination location information and the destination address have been added by the adding unit, to the destination address.

The data communication control apparatus may be characterized in that the sending unit determines based on the destination address whether the mobile terminal device associated with the destination is in an area of its own management and, upon determination that the mobile terminal device is in the area of its own management, sends the target data, not via Internet, but directly, to the forwarding unit that is comprised in a same apparatus.

The data communication control apparatus may further comprise: a notifying unit that outputs, when the first search information is updated by the first updating unit, updated contents to the Internet.

The data communication control apparatus may further comprise: a second updating unit that receives contents to be updated from the network and updates, based on the contents to be updated, at least one of the first search information and the second search information.

The data communication control apparatus may be characterized in that the target data is a message with a header; and the second departure address has been written to the header.

The data communication control apparatus may be characterized in that the mobile terminal device is a wireless device for a mobile wireless station; the network is Internet; the terminal identification numeral of the mobile terminal device and the location information on the repeater are call signs of a wireless station; and the address in the network is an IP address of the Internet.

To achieve the above object, a data communication system according to a second aspect of the present invention comprises a plurality of communication apparatuses, each including a data communication control apparatus in a network communicable with a plurality of repeaters that relay target data wirelessly exchanged between mobile terminal devices, wherein the data communication control apparatus included in each of the plurality of communication apparatuses comprises: a database unit that holds first search information which associates a terminal identification numeral of the mobile terminal device with location information on the repeater as well as second search information which associates the terminal identification numeral of the mobile terminal device with an address in the network; a first updating unit that receives from the repeater latest location information on the mobile terminal device and updates the first search information based on the latest location information; forwarding units that receive the target data and a destination terminal identification numeral thereof via the network from another communication apparatuses, search destination location information associated with the destination terminal identification numeral by referring to the first search information, and forward the target data to the repeater associated with the destination location information; and a correcting unit that receives the target data and a departure terminal identification numeral thereof via the network from another communication apparatuses, searches a first departure address associated with the departure terminal identification numeral by referring to the second search information, and corrects the second search information when the first departure address differs from a second departure address that has already been assigned to the target data.

The data communication system may further comprise: a management apparatus in the network, characterized in that each of the plurality of communication apparatuses receives data of identical contents via the network from the management apparatus and, based on the data of identical contents, keeps contents of its own database consistent with those of databases of other communication apparatuses.

In the data communication system, the management apparatus may manage location information indicating a location where the terminal device exists.

To achieve the above object, a data communication method according to a third aspect of the present invention is applied to a data communication control apparatus used by a communication apparatus in a network communicable with a repeater which relays target data wirelessly exchanged between mobile terminal devices, the method comprising: a first updating step of receiving from the repeater latest location information on the mobile terminal device and updating first search information based on the latest location information; a forwarding step of receiving from the network the target data and a destination terminal identification numeral thereof, searching destination location information associated with the destination terminal identification numeral by referring to the first search information, and forwarding the target data to the repeater associated with the destination location information; and a correcting step of receiving from the network the target data and a departure terminal identification numeral thereof, searching a first departure address associated with the departure terminal identification numeral by referring to second search information, and correcting the second search information when the first departure address differs from the second departure address that has already been assigned to the target data.

To achieve the above object, a computer-readable storage medium recording a data communication program according to a fourth aspect of the present invention is applied to a data communication control apparatus used by a communication apparatus in a network communicable with a repeater which relays target data wirelessly exchanged between mobile terminal devices, the program causing a computer to act as: first updating means that receives from the repeater latest location information on the mobile terminal device and updates first search information based on the latest location information; forwarding means that receives from the network the target data and a destination terminal identification numeral thereof, searches destination location information associated with the destination terminal identification numeral by referring to the first search information, and forwards the target data to the repeater associated with the destination location information; and correcting means that receives from the network the target data and a departure terminal identification numeral thereof, searches a first departure address associated with the departure terminal identification numeral by referring to second search information, and corrects the second search information when the first departure address differs from a second departure address that has already been assigned to the target data.

Separate means may be provided for common features of the foregoing components. However, the overall configuration can be simplified by providing one means for a plurality of components.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The text to follow explains the data communication control apparatus, the data communication system, the data communication method, and the computer-readable storage medium recording a data communication program according to an embodiment of the present invention.

Figure 1:
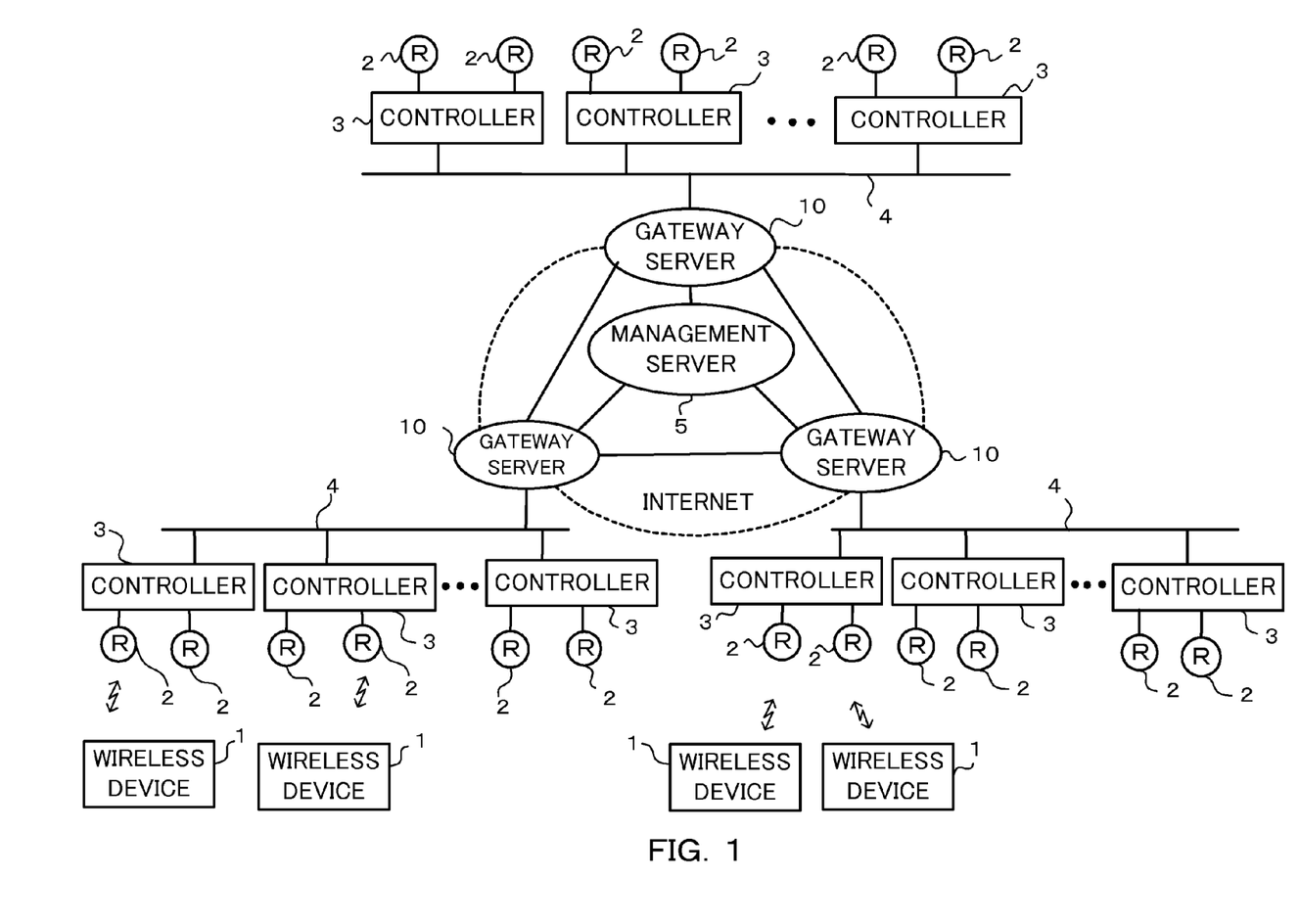
FIG. 1 is a diagram illustrating the configuration of the D-STAR system.

FIG. 1 is a diagram illustrating the D-STAR (Digital Smart Technologies for Amateur Radio) system, to which the data communication control apparatus according to the embodiment of the present invention is applied (D-STAR is a registered trademark of the Japan Amateur Radio League, Inc. in Japan).

The D-STAR system uses the IP (Internet Protocol) network (hereinafter referred to as the "Internet") as a relay circuit between repeaters 2, which relay radio waves of amateur radio wireless devices 1 (mobile terminal). The D-STAR system comprises a plurality of repeaters 2, each provided for one area; a plurality of controllers 3 which control the plurality of repeaters 2; and a plurality of gateway servers 10 for connecting the plurality of controllers 3 to the Internet. The gateway server 10 (communication apparatus) and the controllers 3 are connected by a trunk line 4, which is a high-speed dedicated network. Via the Internet, the gateway servers 10 are connected to each other as well as to a management server 5 (management apparatus) which manages the current locations of the wireless devices 1.

Each of the wireless devices 1 has a user ID (e.g., a call sign of amateur radio), which is a unique identification numeral (terminal identification numeral) for identifying the user. Each of the repeaters 2 and the controllers 3 has an area ID (e.g., a call sign of amateur radio), which is an address for identifying the area for wireless communication. Each of the gateway servers 10 and the management server 5 is assigned an IP address for identifying the location thereof on the Internet.

Figure 2:
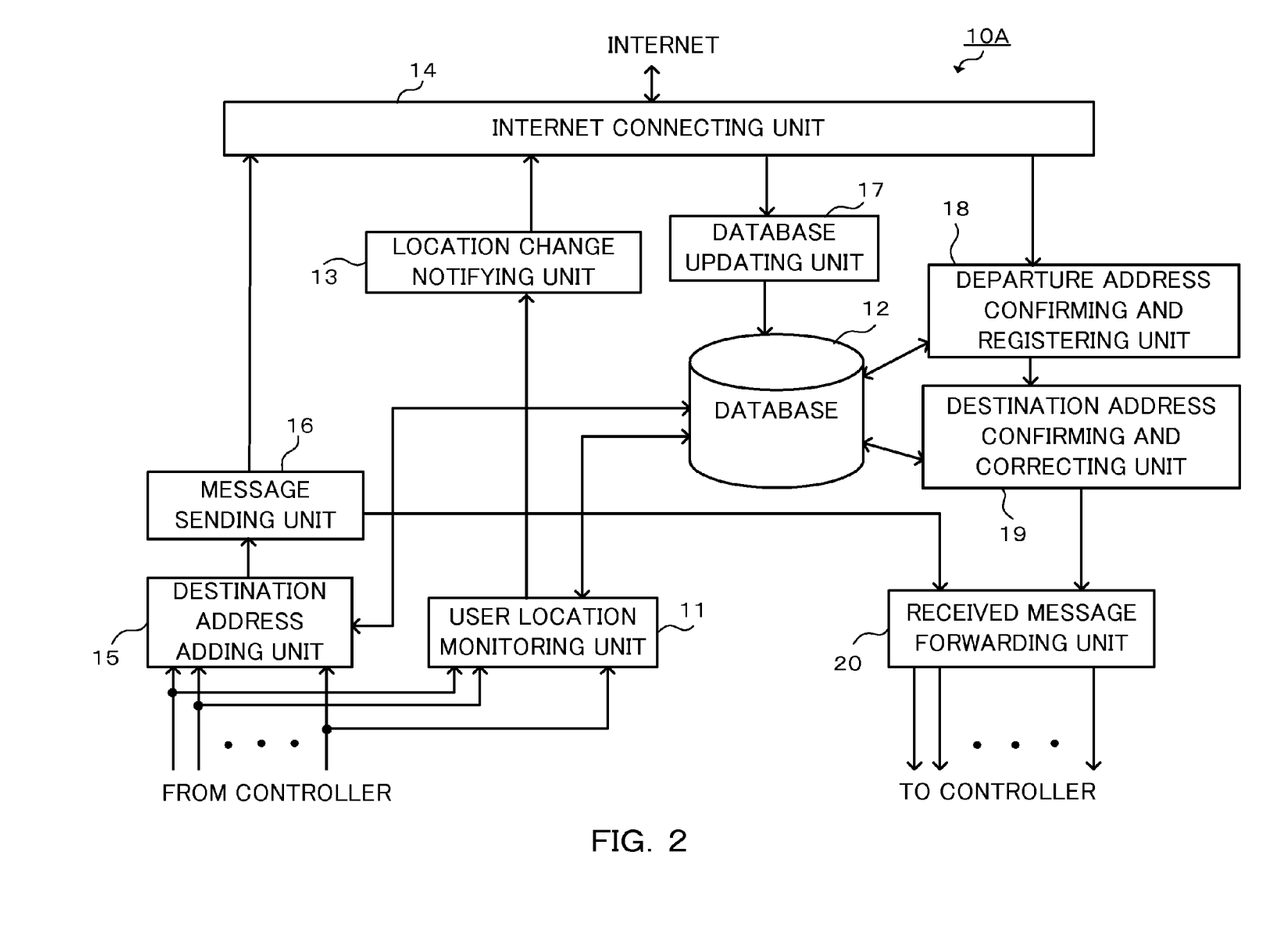
FIG. 2 is a schematic diagram illustrating the data communication control apparatus according to an embodiment of the present invention.

FIG. 2 illustrates the data communication control apparatus 10A according to an embodiment of the present invention, which is applicable as the gateway server 10 in FIG. 1. In this embodiment, the data communication control apparatus 10A presented in FIG. 2 is embedded in the gateway servers 10.

The data communication control apparatus 10A comprises a user location monitoring unit 11 (first updating unit), a database 12 (database unit), a location change notifying unit 13 (notifying unit), an Internet connecting unit 14, a destination address adding unit 15 (adding unit), a message sending unit 16 (sending unit), a database updating unit 17 (second updating unit), a departure address confirming and registering unit 18 (correcting unit), a destination address confirming and correcting unit 19 (forwarding unit), and a received message forwarding unit 20 (forwarding unit).

The user location monitoring unit 11 monitors the locations of the wireless devices 1, which are mobile terminal devices. Upon occurrence of a regular or communication-caused trigger, the user location monitoring unit 11 monitors the location of the user (in other words, the wireless device 1) based on a message that the wireless device 1 sends to let the user's location be known. The message sent from the wireless device 1 is received by the repeater 2, which wirelessly exchange messages with the wireless devices 1. In turn, the message is forwarded to the user location monitoring unit 11 via the controller 3 and trunk line 4. The user location monitoring unit 11 monitors the locations of the wireless devices 1 in the area of its own management and always keep the contents of the database 12 updated.

Figure 3:
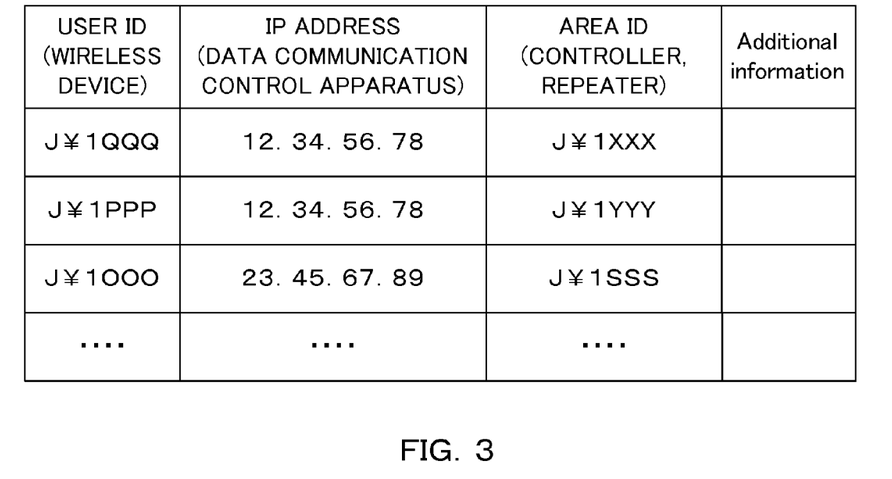
FIG. 3 is a schematic diagram illustrating an example database of FIG. 2.

As shown in FIG. 3, for example, the database 12 holds search information (first search information and second search information) for each user ID for identifying the wireless devices 1. The search information associates IP addresses, which indicate the locations of the data communication control apparatuses 10A (in other words, gateway servers 10) managing the wireless devices 1 on the Internet, with addresses, such as the area ID of the repeater 2 and the controller 3 which covers the communication area of the wireless devices 1. The user ID and the area ID are thereby associated, and so are the user ID and the IP address. In addition to the location information on the wireless devices 1 in the area managed by the data communication control apparatus 10A in which the database 12 is comprised, the database 12 records location information on the wireless devices 1 in the area managed by other data communication control apparatuses 10A. The management server 5 in FIG. 1 (a terminal management apparatus managing location information on all the wireless devices 1 of the system) comprises a database similar to the one shown in FIG. 3.

The user location monitoring unit 11, upon detection of a change to location information on the wireless device 1 in the area of its own management, outputs information on the change to the location change notifying unit 13.

The location change notifying unit 13, based on the information output from the user location monitoring unit 11, produces and outputs a message for requesting the management server 5 to update the location information. The Internet connecting unit 14 is connected to the output side of the location change notifying unit 13.

The Internet connecting unit 14 sends messages from components in the data communication control apparatus 10A other than itself to another data communication control apparatus 10A and the management server 5 in compliance with the Internet Protocol. Also, the Internet connecting unit 14 outputs, to other components of the same data communication control apparatus 10A, transmission messages it has received from outside via the Internet.

The destination address adding unit 15 adds location information on the destination wireless device 1 to a transmission message forwarded from the wireless device 1, the message first received by the repeater 2 and then forwarded via the controller 3 and the trunk line 4 after being sent from the wireless device 1. The destination address adding unit 15 refers to the database 12 using, as a search key, the destination user ID contained in the received transmission message. In turn, the destination address adding unit 15 searches an IP address for identifying the destination data communication control apparatus 10A and an area ID for identifying the repeater 2 and the controller 3 and adds the IP address (destination address) and the area ID (destination location information) to the transmission message. The IP address and area ID thus added are comprised in the transmission frame.

Figure 4:
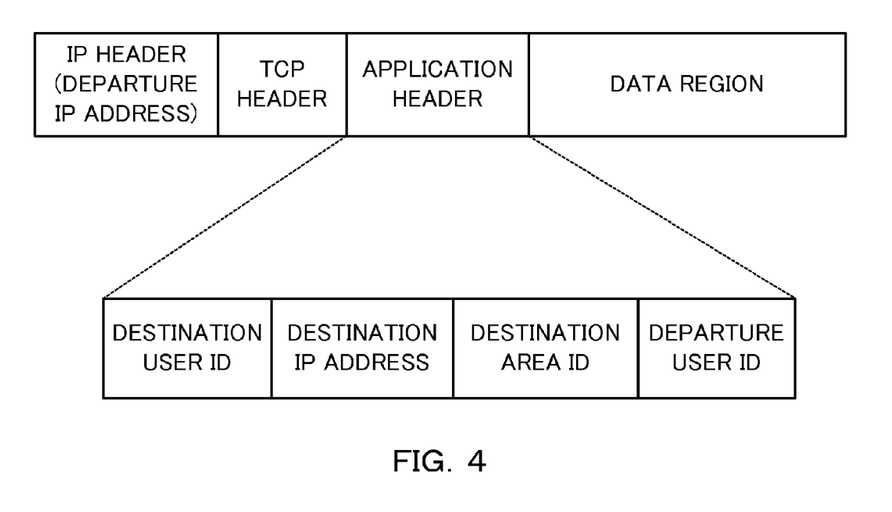
FIG. 4 is a diagram illustrating the structure of a transmission frame.

As shown in FIG. 4, for example, the transmission frame comprises: an IP header, which contains a departure IP address for identifying the departure data communication control apparatus 10A; a TCP (or UDP) header showing the transmission control protocol; an application header defined according to the application; and a data region containing a voice/sound message and like data that the user specifically intends to deliver to the destination wireless device 1. Also written to the application header are a destination user ID for identifying the destination wireless device 1, a destination IP address for identifying the destination data communication control apparatus 10A, a destination area ID for identifying the destination repeater 2 and the destination controller 3, and a departure user ID for identifying the departure wireless device 1. The transmission message added with the destination address, etc. is output from the destination address adding unit 15 to the message sending unit 16.

The message sending unit 16, based on the destination IP address added to the transmission message, which has been output from the destination address adding unit 15, determines whether the destination wireless device 1 is in the area managed by another data communication control apparatus 10A or in the area of its own management. In turn, the message sending unit 16, based on the determination result, outputs the transmission message to the appropriate destination. When the destination is the wireless device 1 in the area managed by another data communication control apparatus 10A, the transmission message is output to the Internet connecting unit 14. When the wireless device 1 is in the area of its own management, the transmission message is output to the received message forwarding unit 20, which will be described later.

The Internet connecting unit 14 is, to handle messages received via the Internet, connected with the database updating unit 17 and the departure address confirming and registering unit 18. The database updating unit 17 updates the contents of the database 12 according to the location change information on the wireless device 1 which is received from the management server 5.

When receiving a message from another data communication control apparatus 10A, the departure address confirming and registering unit 18 refers to the database 12 to confirm the IP address of the departure data communication control apparatus 10A of the received message. The information registered in the database 12 is corrected if the confirmation result shows it is necessary. More specifically, the departure address confirming and registering unit 18 refers to the database 12 using the departure user ID in the application header of the received message as a search keyword to search the IP address of the data communication control apparatus 10A associated with the departure user ID. Then the departure address confirming and registering unit 18 confirms whether the IP address searched from the database 12 agrees with the departure IP address that is in advance assigned to the received message (e.g., the departure IP address in the IP header). If they are not in agreement, the departure address confirming and registering unit 18 overwrites the departure IP address acquired from the received message to the IP address associated with the departure user ID in the database 12. Among the types of search information presented in FIG. 3, the second search information, which associates the user ID and IP address, is thereby corrected.

The destination address confirming and correcting unit 19 is connected to the output side of the departure address confirming and registering unit 18. The destination address confirming and correcting unit 19 refers to the database 12 and confirms the destination area ID in the application header of the received message. The destination area ID in the received message is corrected if the confirmation result shows it is necessary. More specifically, the destination address confirming and correcting unit 19 uses the destination user ID contained in the application header of the received message as a search keyword to search the database 12 and acquires the destination area ID associated with this user ID. The destination address confirming and correcting unit 19 confirms whether the area ID acquired from the database 12 agrees with the destination area ID in the received message. If they are not in agreement, the destination address confirming and correcting unit 19 corrects the destination area ID in the received message to the area ID acquired from the database 12.

The received message forwarding unit 20 is connected to the output side of the destination address confirming and correcting unit 19. The received message forwarding unit 20 forwards received messages that have been confirmed and corrected by the destination address confirming and correcting unit 19 and transmission messages output from the foregoing message sending unit 16 to the controllers 3 specified by the destination area ID of the message.

The text to follow separately explains the database managing process, the message receiving process, and the message sending process performed by the data communication control apparatus 10A shown in FIG. 2.

(1) Database Managing Process

The wireless device 1, either regularly or at the time of occurrence of a trigger for requesting communication or the like, sends a message for notifying its own current location. The message sent from the wireless device 1 is received by the nearest repeater 2. This message is forwarded from the controller 3, which controls this repeater 2, to the user location monitoring unit 11 of the data communication control apparatus 10A via the trunk line 4. Then the database managing process shown in FIG. 5 starts.

Figure 5:
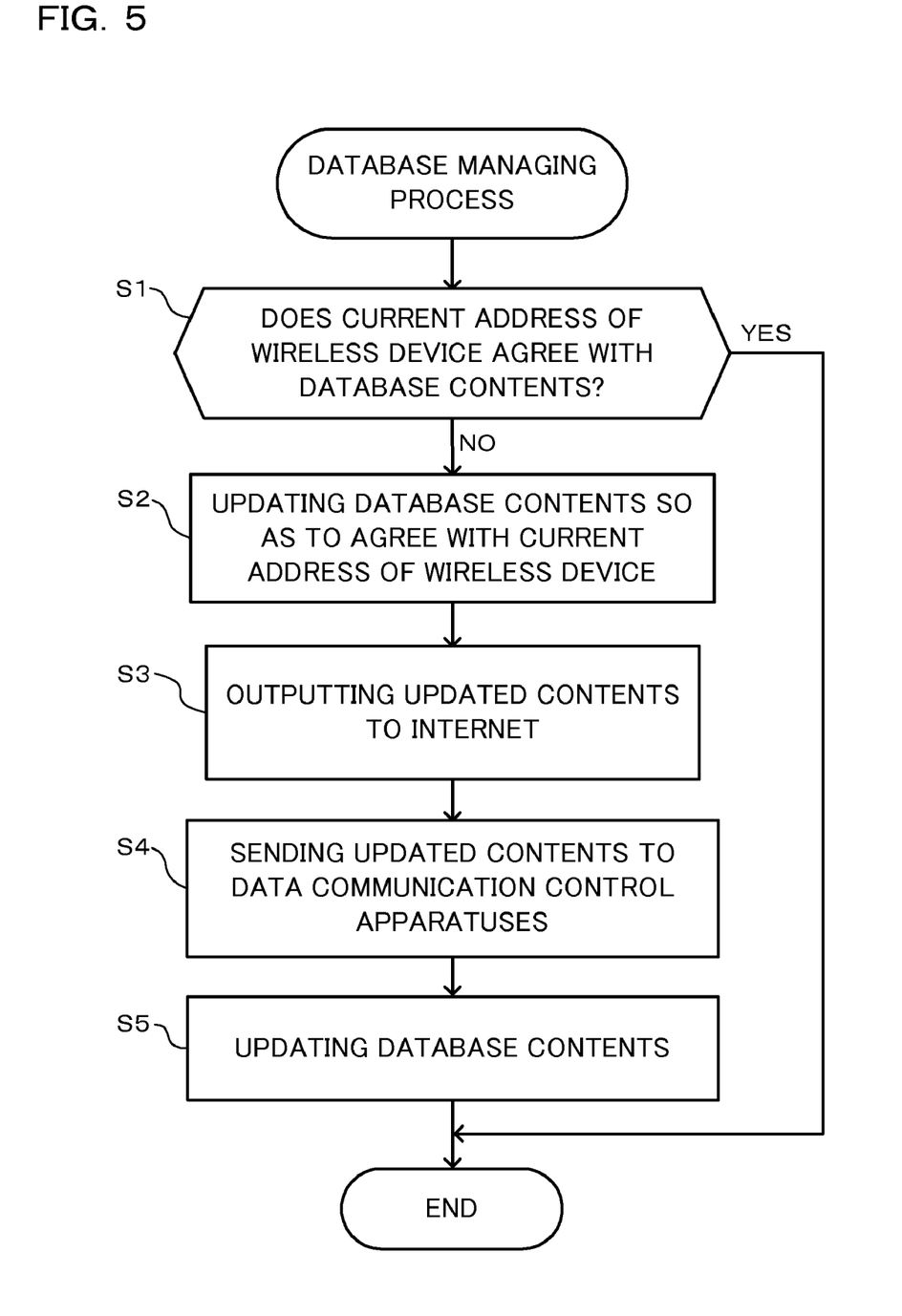
FIG. 5 is a flowchart illustrating the database managing process of the data communication control apparatus of FIG. 2.

The user location monitoring unit 11 refers, based on the message sent thereto via the trunk line 4, to the database 12 and confirms the user ID of the wireless device 1 and the address of the area ID of the repeater 2 and the controller 3 corresponding to the location of the wireless device 1 (step S1).

When the current address of the wireless device 1 is determined not to agree with the contents of the database 12 in step S1 (step S1: NO), the user location monitoring unit 11 updates the contents of database 12 so that it contains an address indicating the current location (the latest location information) (step S2). When the user ID of the wireless device 1 is registered in the database 12, the user location monitoring unit 11 corrects the address associated with the user ID to the present address. When the user ID of the wireless device 1 is not registered in the database 12, the user location monitoring unit 11 additionally registers, to the database 12, data comprising the current address and user ID of the wireless device 1.

The user location monitoring unit 11 outputs the updated (corrected or additionally registered) contents to the Internet (step S3). More specifically, the user location monitoring unit 11 outputs information including the updated contents to the location change notifying unit 13. The location change notifying unit 13 generates a message for requesting the management server 5 to update location information based on the contents of the information output from the user location monitoring unit 11. The message for requesting location information update includes the contents updated by the user location monitoring unit 11 and is output to the Internet via the Internet connecting unit 14. Afterward, the message for requesting location information update is sent to the management server 5 via the Internet.

Upon receipt of the message for requesting location information update, the management server 5 updates the contents of the database under its own management and sends, to data communication control apparatuses 10A via the Internet, a message for requesting location information update with the same contents (step S4).

Upon receipt of this message from the management server 5 via the Internet, each of the data communication control apparatuses 10A causes its database updating unit 17 to update the contents of the database 12 comprised in the same data communication control apparatus 10A (step S5). Since all the data communication control apparatuses 10A receive data with the same contents from the management server 5, the contents of the databases 12 of the data communication control apparatus 10A, including additional information, are made consistent.

When the current address of the wireless device 1 is determined to agree with the contents of the database 12 in step S1 (step S1: YES), the process described in FIG. 5 ends.

(2) Message Receiving Process

Figure 6:
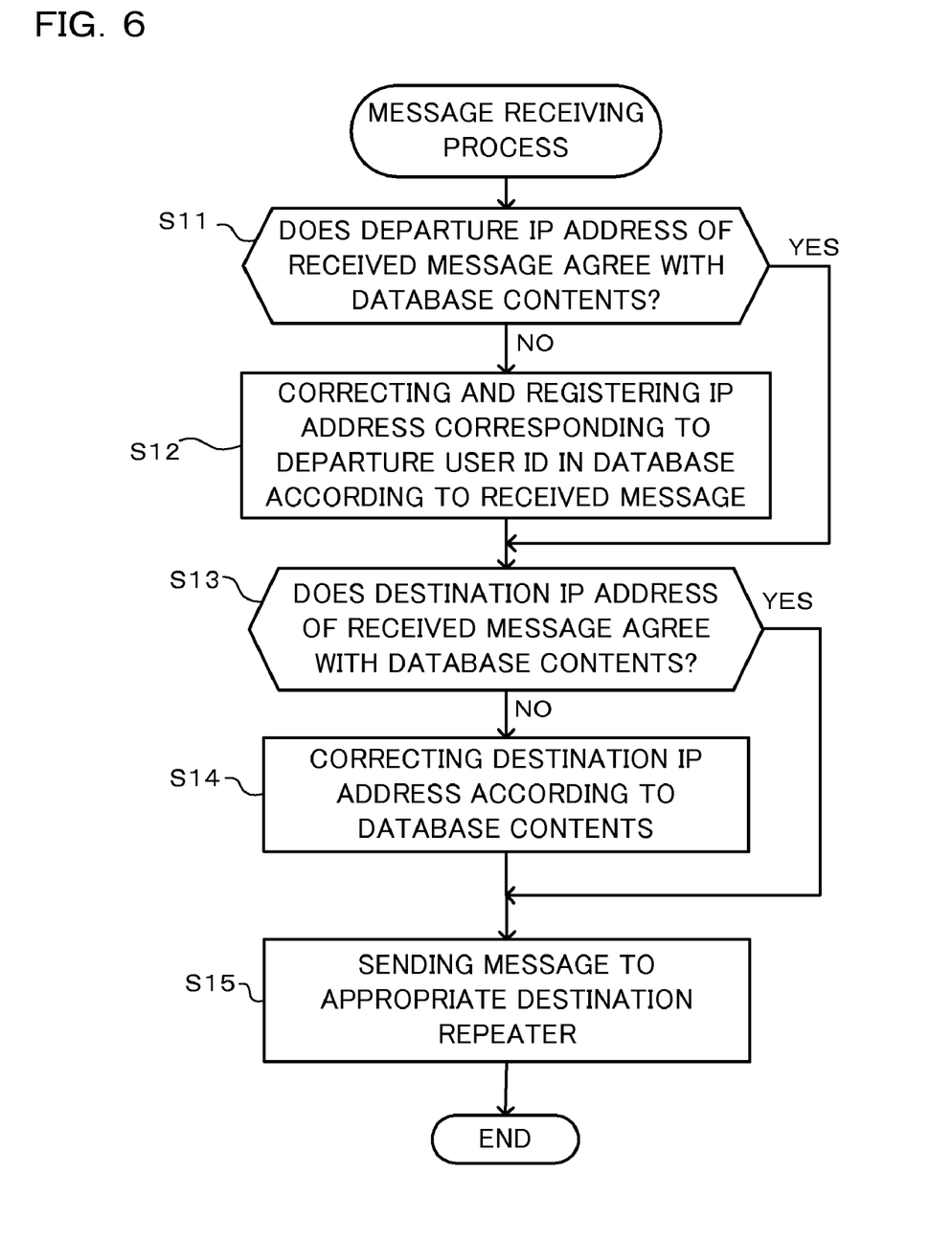
FIG. 6 is a flowchart illustrating the message receiving process of the data communication control apparatus of FIG. 2.

A message sent from another data communication control apparatus 10A via the Internet is received by the Internet connecting unit 14, which in turn forwards the message to the departure address confirming and registering unit 18, and the message receiving process shown in FIG. 6 starts.

The departure address confirming and registering unit 18 confirms whether the IP address of the departure data communication control apparatus 10A of the received message agrees with the contents of the database 12 (step S11). More specifically, the departure address confirming and registering unit 18 refers to the database 12 using the departure user ID contained in the application header of the received message as a search keyword to search the IP address of the data communication control apparatus 10A associated with the departure user ID. Then the departure address confirming and registering unit 18 confirms whether the searched IP address of the data communication control apparatus 10A agrees with the departure IP address contained in the IP header of the received message.

When disagreement is determined in step 11 (step S11: NO), the departure address confirming and registering unit 18 corrects the contents of the database 12 and registers the corrected contents so that the IP address of the data communication control apparatus 10A associated with the departure user ID is the departure IP address contained in the IP header of the received message (step S12). Even when a message for requesting location information update is not received from the management server 5, the IP address of the data communication control apparatus 10A managing the current location of the departure wireless device 1 can be registered in the database 12 based on the message received from the departure wireless device 1. At this point, however, the current location of the wireless device 1 in the area of the data communication control apparatus 10A is unknown, so the area ID, etc. remain unchanged.

When agreement is determined in step 11 (step S11: YES) or after step S12, the destination address confirming and correcting unit 19 confirms whether the contents of the destination user ID and area ID in the received message agree with the contents of the database 12 (step S13). More specifically, the destination address confirming and correcting unit 19 refers to the database 12 using the destination user ID contained in the application header of the received message as a search keyword to search the destination area ID associated with the destination user ID. Whether the searched destination area ID agrees with the destination area ID contained in the application header of the received message is confirmed.

When disagreement is determined in step S13 (step S13: NO), the destination address confirming and correcting unit 19 corrects the destination area ID contained in the application header of the received message to the destination area ID searched from the database 12 (step S14). Even if the destination user address specified by the received message is incorrect, it is corrected according to the registered contents of the database 12. More specifically, due to the above-described database managing process, the database 12 always keeps updated the registered location information on the wireless devices 1 in the area of its own management. Even upon receipt of a message with a destination address assigned based on old information from another data communication control apparatus 10A, the destination address can be corrected according to the latest location information.

When agreement is determined in step S13 (step S13: YES) or after step S14, the received message forwarding unit 20 forwards a received message output from the destination address confirming and correcting unit 19 to the appropriate repeater 2 via the trunk line 4 based on the destination area ID contained in the application header of the received message (step S15). Then the message is sent to the destination wireless device 1 wirelessly from the repeater 2 corresponding to the current location of the destination wireless device 1.

(3) Message sending process

When the wireless device 1 sends a message to a specific destination, the message sent therefrom is received by the nearest repeater 2. The controller 3, which controls this repeater 2, forwards the message via the trunk line 4 to the destination address adding unit 15 of the data communication control apparatus 10A. Then the message sending process (FIG. 7) starts.

Figure 7:
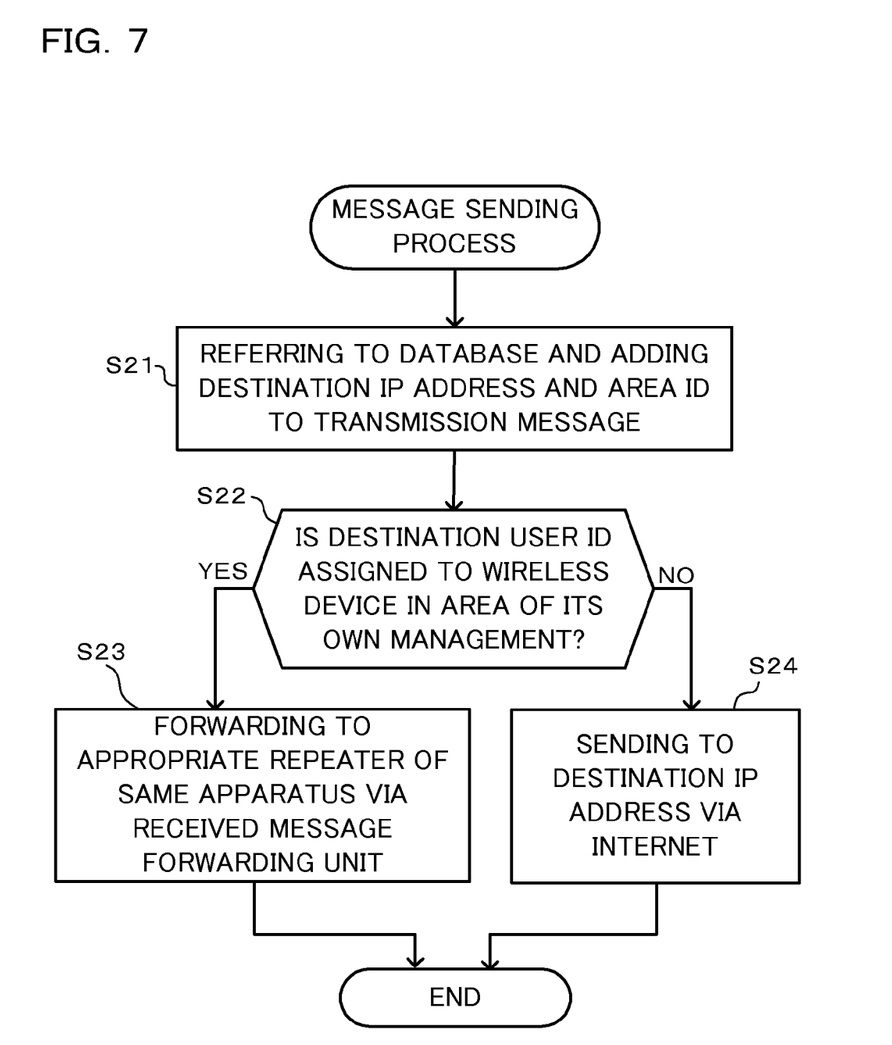
FIG. 7 is a flowchart illustrating the message sending process of the data communication control apparatus of FIG. 2.

The destination address adding unit 15 refers to the database 12 using the destination user ID in the transmission message output from the departure wireless device 1 as a search keyword. The destination IP address (destination address) for identifying the destination data communication control apparatus 10A as well as the destination area ID (destination location information) for identifying the repeater 2 and the controller 3 are searched. The destination address adding unit 15 adds the searched destination IP address and destination area ID to the transmission message (step S21). The IP address and area ID thus added are comprised in the transmission frame shown in FIG. 4.

Based on the destination IP address of the application header added to the transmission message output from the destination address adding unit 15, the message sending unit 16 determines whether the destination wireless device 1 is in the area of its own management or in the area managed by another data communication control apparatus 10A (step S22).

When the destination is determined to be in the area of its own management in step S22 (step S22: YES), the message sending unit 16 forwards the transmission message to the received message forwarding unit 20 comprised in the same data communication control apparatus 10A (step S23). The received message forwarding unit 20 forwards, to the appropriate repeater 2 via the trunk line 4, the received message output from the message sending unit 16 based on the destination area ID contained in the application header of the received message. Then the message is sent to the destination wireless device 1 wirelessly from the repeater 2 corresponding to the current location of the destination wireless device 1.

When determined to be in the area managed by another data communication control apparatus 10A in step S22 (step S22: NO), the message sending unit 16 sends the transmission message to the Internet connecting unit 14 (step S24). The transmission message is sent via the Internet to the data communication control apparatus 10A specified by the destination IP address. Messages sent to another data communication control apparatus 10A are processed as described in the message receiving process above.

As can be seen in the above, the data communication control apparatus 10A according to this embodiment has the following advantages:

Using the user location monitoring unit 11, the data communication control apparatus 10A monitors the location of the wireless device 1 in the area of its own management and updates the location information on the wireless device 1 in the database 12 immediately after the location thereof moves. Simultaneously, the destination address confirming and correcting unit 19 sends a message to the wireless device 1 in the area of its own management based on the location information in the database 12. Even prior to updating the contents of the database of the management server 5, the data communication control apparatus 10A according to this embodiment can unfailingly send the message to the destination wireless device 1 in the area of its own management.

The departure address confirming and registering unit 18 confirms the departure IP address of a message sent from another data communication control apparatus 10A and correct location information in the database 12. Immediately after the departure wireless device 1 moves from the area managed by one data communication control apparatus 10A to the area managed by another apparatus, a reply message can be sent to the apparatus which manages the wireless device 1 after the moving, even if the contents of the database of the management server 5 has not been updated. In this case, the address of the area ID, etc. of the data communication control apparatus 10A which manages the wireless device 1 after the moving have not been corrected. The data communication control apparatus 10A in receipt of the reply message has already registered, in the database, the latest location information on the wireless device 1 in the area of its own management. The reply message is therefore unfailingly forwarded to its destination.

The foregoing hardware configurations and flowcharts are simply examples, so they may be optionally changed.

(a) A data communication control apparatus 10A used as a gateway server of the D-STAR amateur radio system has been explained. It is also applicable for wireless communication in which the Internet and other like communication networks are used as relay circuits.

(b) In FIG. 1, the data communication control apparatus 10A (gateway server 10) and the repeaters 2 are connected via the trunk line 4 and the controllers 3. However, the data communication control apparatus 10A may be configured to directly control the repeaters 2 without having the trunk line 4 and the controllers 3 in between.

(c) The structure of data contained in the database 12 and the frame format of transmission and received messages are not limited to those presented in FIGS. 3 and 4. They may be modified according to the system in which they are used.

(d) The situation where the management server 5 informs the data communication control apparatus 10A of a change to location information on the wireless device 1 has been explained. However, the data communication control apparatus 10A may be configured to inquire the management server 5 regarding the location information on the destination wireless device 1 at the time of message transmission.

(e) Each of the data communication control apparatuses 10A may also be configured to directly send, to another data communication control apparatus 10A, the location information on the wireless devices 1 in the area of its own management without using the management server 5.

(f) In the explanation of the embodiment illustrated in FIG. 2, the user location monitoring unit 11 and the other components are described as hardware devices with independent functions. However, the functions of these components may be achieved using a program (computer-readable storage medium).

Components playing a core role in processes performed by a data communication control apparatus 10A are not necessarily dependent on a dedicated system. The ordinary computer system may be used for achieving such processes. For example, a computer program performing the above operation may be stored in a computer-readable recording medium (flexible disk, CD-ROM, DVD-ROM, or the like) for distribution thereof, so that the computer program can be installed in a computer to constitute the data communication control apparatus 10A performing the foregoing processes. Also, the computer program may be stored in a storage device of a server apparatus on a communication network, such as the Internet, so that an ordinary computer system can download the program to constitute the data communication control apparatus 10A.

When the data communication control apparatus 10A is achieved either by separately using the OS (operating system) and the application program or by cooperation therebetween, only the application program may be stored in a storage medium or a storage device.

The computer program may be superimposed in carrier waves for distribution via the communication network. For example, the computer program may be posted on the Bulletin Board System (BBS) of the communication network for distribution thereof via the network. The computer program may be configured to execute the above processes when the computer program is launched to operate like any other application program under control of the OS.

Data subject to data communication as described herein are not messages only, but they are optional.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A data communication control apparatus used by a communication apparatus in a network communicable with a repeater which relays target data wirelessly exchanged between mobile terminal devices, the data communication control apparatus comprising:

a database unit that holds first search information which associates a terminal identification numeral of the mobile terminal device with location information on the repeater as well as second search information which associates the terminal identification numeral of the mobile terminal device with an address in the network;

a first updating unit that receives from the repeater latest location information on the mobile terminal device and updates the first search information based on the latest location information;

forwarding units that receive from the network the target data and a destination terminal identification numeral thereof, search destination location information associated with the destination terminal identification numeral by referring to the first search information, and forward the target data to the repeater associated with the destination location information; and a correcting unit that receives from the network the target data and a departure terminal identification numeral thereof, searches a first departure address associated with the departure terminal identification numeral by referring to the second search information, and corrects the second search information when the first departure address differs from a second departure address that has already been assigned to the target data.

2. The data communication control apparatus according to claim 1 further comprising:

an adding unit that receives from the repeater the target data and the destination terminal identification numeral thereof, searches the destination location information and a destination address associated with the destination terminal identification numeral by referring to the first search information and the second search information, and adds the destination location information and the destination address to the target data; and a sending unit that sends the target data, to which the destination location information and the destination address have been added by the adding unit, to the destination address.

3. The data communication control apparatus according to claim 2, wherein the sending unit determines based on the destination address whether the mobile terminal device associated with the destination is in an area of its own management and, upon determination that the mobile terminal device is in the area of its own management, sends the target data, not via Internet, but directly, to the forwarding unit that is comprised in a same apparatus.

4. The data communication control apparatus according to claim 1 further comprising:

a notifying unit that outputs, when the first search information is updated by the first updating unit, updated contents to the Internet.

5. The data communication control apparatus according to claim 1 further comprising:

a second updating unit that receives contents to be updated from the network and updates, based on the contents to be updated, at least one of the first search information and the second search information.

6. The data communication control apparatus according to claim 1, wherein the target data is a message with a header; and the second departure address has been written to the header.

7. The data communication control apparatus according to claim 1, wherein the mobile terminal device is a wireless device for a mobile wireless station;
the network is Internet;
the terminal identification numeral of the mobile terminal device and the location information on the repeater are call signs of a wireless station; and
the address in the network is an IP address of the Internet.

8. A data communication system comprising a plurality of communication apparatuses, each including a data communication control apparatus in a network communicable with a plurality of repeaters that relay target data wirelessly exchanged between mobile terminal devices, wherein the data communication control apparatus included in each of the plurality of communication apparatuses comprises:

a database unit that holds first search information which associates a terminal identification numeral of the mobile terminal device with location information on the repeater as well as second search information which associates the terminal identification numeral of the mobile terminal device with an address in the network;

a first updating unit that receives from the repeater latest location information on the mobile terminal device and updates the first search information based on the latest location information;

forwarding units that receive the target data and a destination terminal identification numeral thereof via the network from another communication apparatuses, search destination location information associated with the destination terminal identification numeral by referring to the first search information, and forward the target data to the repeater associated with the destination location information; and a correcting unit that receives the target data and a departure terminal identification numeral thereof via the network from another communication apparatuses, searches a first departure address associated with the departure terminal identification numeral by referring to the second search information, and corrects the second search information when the first departure address differs from a second departure address that has already been assigned to the target data.

9. The data communication system according to claim 8 further comprising:

a management apparatus in the network,
wherein each of the plurality of communication apparatuses receives data of identical contents via the network from the management apparatus and, based on the data of identical contents, keeps contents of its own database unit consistent with those of databases of other communication apparatuses.

10. The data communication system according to claim 9, wherein the management apparatus manages location information indicating a location where the mobile terminal device exists.

11. A data communication method applied to a data communication control apparatus used by a communication apparatus in a network communicable with a repeater which relays target data wirelessly exchanged between mobile terminal devices, the method comprising:

a first updating step of receiving from the repeater latest location information on the mobile terminal device and updating first search information based on the latest location information;

a forwarding step of receiving from the network the target data and a destination terminal identification numeral thereof, searching destination location information associated with the destination terminal identification numeral by referring to the first search information, and forwarding the target data to the repeater associated with the destination location information; and a correcting step of receiving from the network the target data and a departure terminal identification numeral thereof, searching a first departure address associated with the departure terminal identification numeral by referring to second search information, and correcting the second search information when the first departure address differs from the second departure address that has already been assigned to the target data.

12. A non-transitory computer-readable storage medium recording a data communication program applied to a data communication control apparatus used by a communication apparatus in a network communicable with a repeater which relays target data wirelessly exchanged between mobile terminal devices, the program when executed on a computer is operable to:

receive from the repeater latest location information on the mobile terminal device and update first search information based on the latest location information;

receive from the network the target data and a destination terminal identification numeral thereof, search destination location information associated with the destination terminal identification numeral by referring to the first search information, and forward the target data to the repeater associated with the destination location information; and receive from the network the target data and a departure terminal identification numeral thereof, search a first departure address associated with the departure terminal identification numeral by referring to second search information, and correct the second search information when the first departure address differs from a second departure address that has already been assigned to the target data.

* * * * *